United States Patent
Lee et al.

(10) Patent No.: US 11,267,180 B2
(45) Date of Patent: Mar. 8, 2022

(54) EXTRUSION DIE AND EXTRUSION METHOD OF SHEET USING THE SAME

(71) Applicant: LG Chem, Ltd., Seoul (KR)

(72) Inventors: Chae Gyu Lee, Daejeon (KR); Myung Han Lee, Daejeon (KR); Byeong In Ahn, Daejeon (KR); Kyung Hwan Yoon, Daejeon (KR); Chang Kwon Chung, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/481,681

(22) PCT Filed: Jan. 26, 2018

(86) PCT No.: PCT/KR2018/001159
§ 371 (c)(1),
(2) Date: Jul. 29, 2019

(87) PCT Pub. No.: WO2018/143609
PCT Pub. Date: Aug. 9, 2018

(65) Prior Publication Data
US 2019/0375144 A1    Dec. 12, 2019

(30) Foreign Application Priority Data
Jan. 31, 2017    (KR) .......................... 10-2017-0013513

(51) Int. Cl.
*B29C 48/305*    (2019.01)
*B29C 48/00*    (2019.01)
(Continued)

(52) U.S. Cl.
CPC ............ *B29C 48/022* (2019.02); *B29C 48/08* (2019.02); *B29C 48/305* (2019.02);
(Continued)

(58) Field of Classification Search
CPC ....... B29C 48/00; B29C 48/30; B29C 48/305; B29C 48/78; B29C 48/832; B29C 4948/00
See application file for complete search history.

(56) References Cited

U.S. PATENT DOCUMENTS 4,824,898 A * 4/1989 Sukigara ............... B29C 48/305
524/401
5,292,463 A    3/1994 Paul
(Continued)

FOREIGN PATENT DOCUMENTS

JP    S6046227 A    3/1985
JP    S6478823 A    3/1989
(Continued)

OTHER PUBLICATIONS

Patent Translate, "Description JP2013103367A", Feb. 3, 2021, EPO and Google. (Year: 2021).*
(Continued)

*Primary Examiner* — Joseph S Del Sole
*Assistant Examiner* — Margaret B Hayes
(74) *Attorney, Agent, or Firm* — Lerner, David, Littenberg, Krumholz & Mentlik, LLP

(57) ABSTRACT

The present invention relates to an extrusion die and a method for extruding a sheet using the same, and according to one aspect of the present invention, there is provided an extrusion die comprising a storage part configured to hold a raw material, the storage part defining a first width, a pressure part configured to move the raw material through the storage part, a first die defining a second width less than the first width, such that a flow width of the raw material becomes narrower, a second die in fluid communication with the first die, the second die defining a width that increases from the second width to a third width, such that the flow width of the raw material passing through the first die
(Continued)

becomes wider and a flow thickness becomes smaller, and a heating part configured to heat the raw material passing through the second die.

8 Claims, 6 Drawing Sheets

(51) Int. Cl.
  *B29C 48/80* (2019.01)
  *B29C 48/885* (2019.01)
  *B29C 48/08* (2019.01)
  *B29C 48/86* (2019.01)
  *B29C 48/92* (2019.01)
  *B29L 7/00* (2006.01)
  *B29C 48/475* (2019.01)
  *B29C 48/485* (2019.01)
  *B29C 48/285* (2019.01)
  *B29C 48/29* (2019.01)

(52) U.S. Cl.
  CPC .......... *B29C 48/832* (2019.02); *B29C 48/865* (2019.02); *B29C 48/873* (2019.02); *B29C 48/885* (2019.02); *B29C 48/92* (2019.02); *B29C 48/288* (2019.02); *B29C 48/29* (2019.02); *B29C 48/475* (2019.02); *B29C 48/485* (2019.02); *B29C 2948/926* (2019.02); *B29C 2948/92514* (2019.02); *B29C 2948/92628* (2019.02); *B29C 2948/92704* (2019.02); *B29C 2948/92876* (2019.02); *B29C 2948/92895* (2019.02); *B29C 2948/92904* (2019.02); *B29L 2007/002* (2013.01)

(56) References Cited

U.S. PATENT DOCUMENTS

| | | | | |
|---|---|---|---|---|
| 7,036,291 | B1* | 5/2006 | Stark | B65B 9/042 53/454 |
| 2002/0192401 | A1* | 12/2002 | Matsumoto | B27N 3/28 428/15 |
| 2006/0099289 | A1* | 5/2006 | Fukumura | B29C 48/12 425/191 |
| 2007/0154683 | A1* | 7/2007 | Ausen | B32B 25/16 428/172 |
| 2009/0261500 | A1* | 10/2009 | Ueda | B29C 48/91 264/210.1 |
| 2013/0154142 | A1* | 6/2013 | Ripple | B29C 48/05 264/40.1 |

FOREIGN PATENT DOCUMENTS

| | | | |
|---|---|---|---|
| JP | H06182850 | A | 7/1994 |
| JP | H08118452 | A | 5/1996 |
| JP | 2000289086 | A | 10/2000 |
| JP | 2001150510 | A | 6/2001 |
| JP | 3878736 | B2 | 2/2007 |
| JP | 2010253755 | A | 11/2010 |
| JP | 2013103367 | A * | 5/2013 |
| JP | 2013103367 | A | 5/2013 |
| KR | 101140685 | B1 | 5/2012 |
| WO | 2016136172 | A1 | 9/2016 |

OTHER PUBLICATIONS

Patent Translate, Description JP201303367A, Feb. 9, 2021, EPO and Google. (Year: 2021).*
International Search Report for Application No. PCT/KR2018/001159 dated May 1, 2018, pp. 1-2.
Supplementary European Search Report with Written Opinion for Application No. 18747975.3 dated Dec. 18, 2019, 9 pages.

* cited by examiner

[Figure 1]
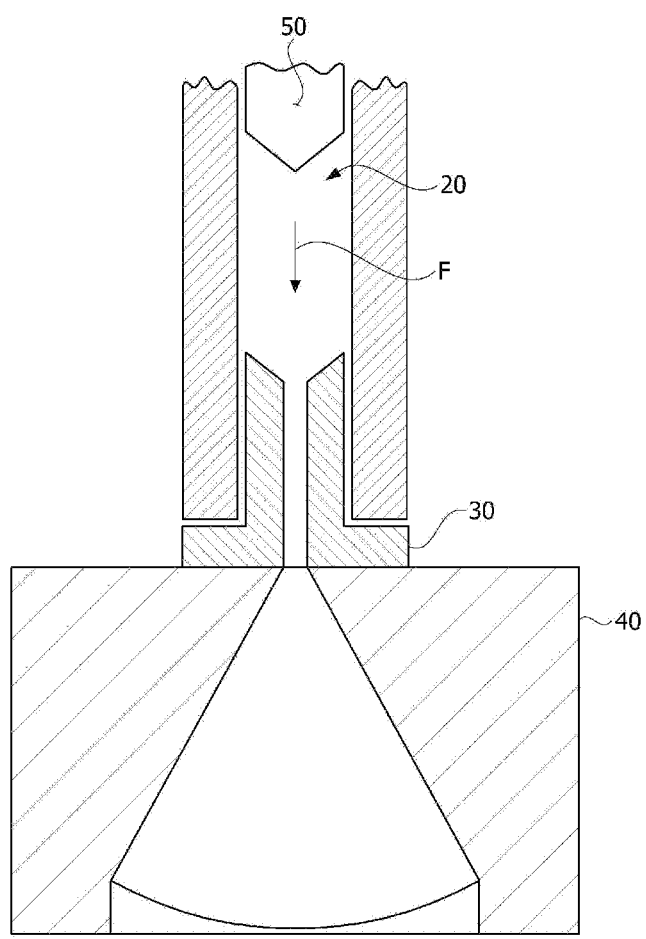

[Figure 2]
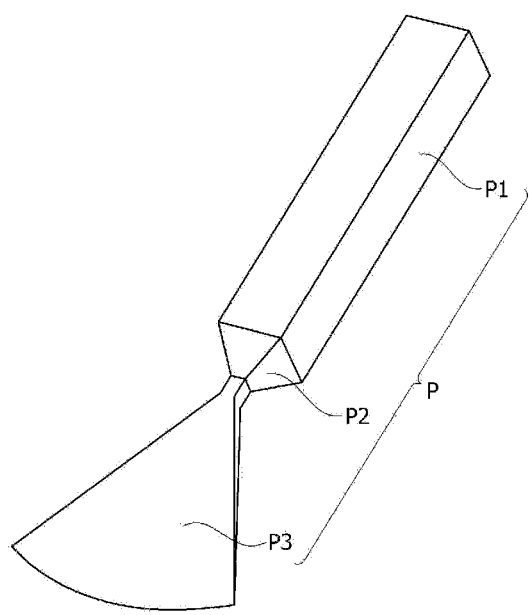

[Figure 3]
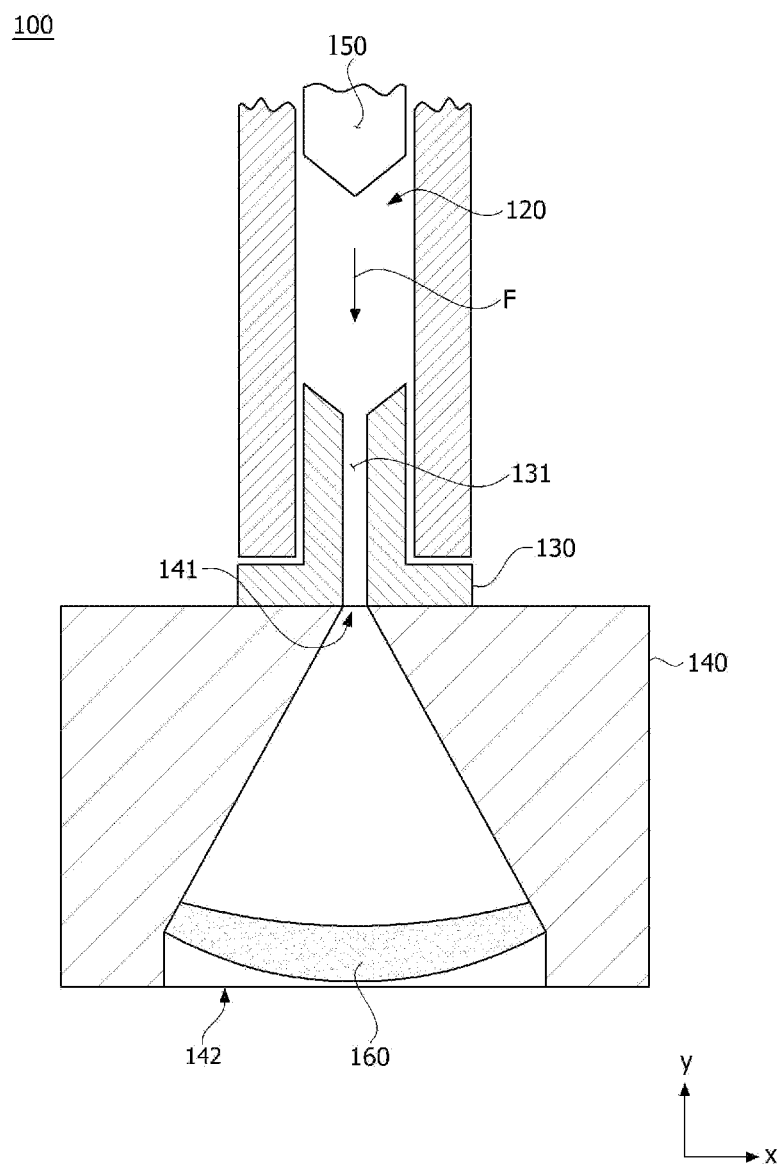

[Figure 4]
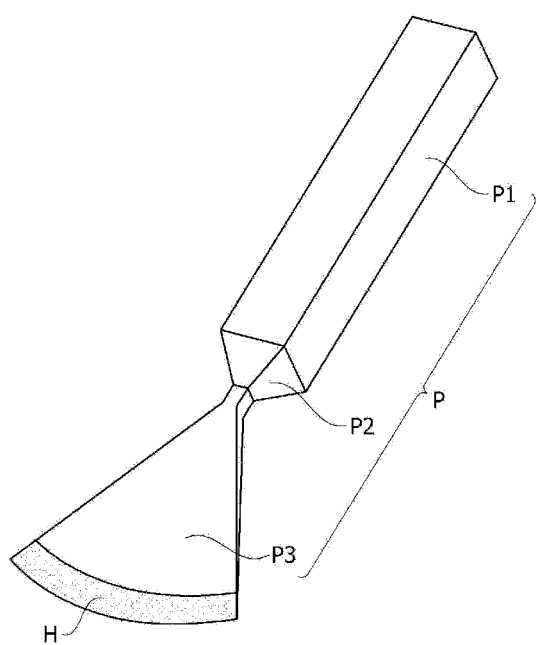

[Figure 5]
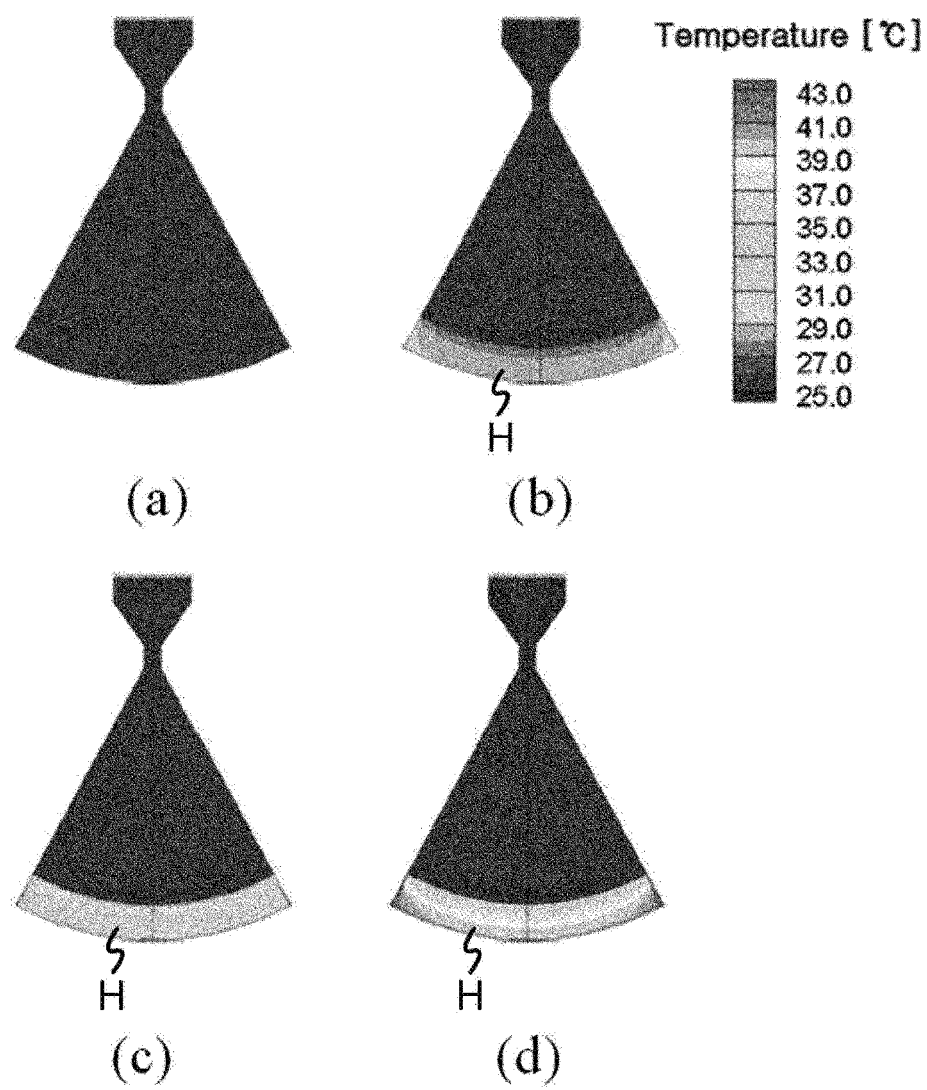

[Figure 6]
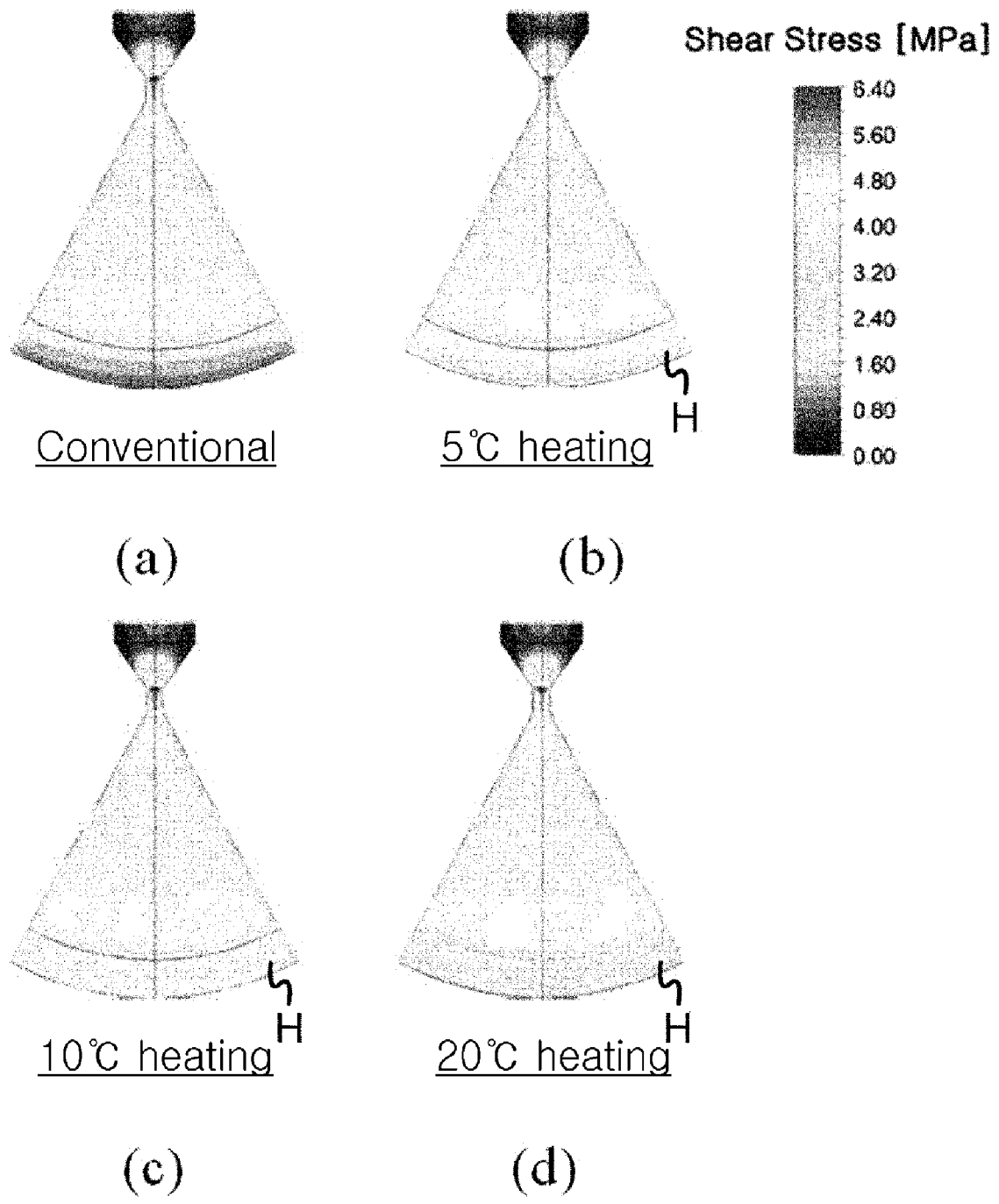

EXTRUSION DIE AND EXTRUSION METHOD OF SHEET USING THE SAME

CROSS-REFERENCE TO RELATED APPLICATIONS

This application is a national phase entry under 35 U.S.C. § 371 of International Patent Application No. PCT/KR2018/001159, filed on Jan. 26, 2018, published in Korean, which claims the benefit of the filing date of Korean Patent Application No. 10-2017-0013513, filed on Jan. 31, 2017, the disclosures of which are hereby incorporated herein by reference in their entireties.

TECHNICAL FIELD

The present invention relates to an extrusion die and a method for extruding a sheet using the same.

BACKGROUND ART

Generally, a sheet extrusion die is a device for processing a polymer paste into a sheet form.

FIG. 1 is a conceptual diagram showing a general sheet extrusion die (10), and FIG. 2 is a conceptual diagram reproducing flow of a raw material (P) passing through the sheet extrusion die (10) of FIG. 1.

Referring to FIGS. 1 and 2, the extrusion die (10) comprises a storage part (20) in which a raw material (P) is stored, a pressure part (50), a capillary die (30) for pressurizing the raw material (P) so as to be fibrous and a sheet die (40) for making the raw material passing through the capillary die (30) into a sheet. On the other hand, in FIG. 1, F represents the moving direction of the raw material, and in FIG. 2, P1 represents the raw material in the storage part, P2 represents the raw material in a first die and P3 represents the raw material in a second die (or referred to as 'sheet').

Upon extruding the sheet, there is a defect that the sheet (P3) is not stably formed at the outlet of the second die (40), thereby being tilted to one side or waving to the left and right. This is caused by very high stress around the outlet of the second die (40) under a sharp stress gradient when it passes through the sheet die (40).

The sheet formed by extrusion is further stretched to be processed into a film, and if a defect occurs in the extrusion process, there is a problem in the progress of the subsequent processes.

DISCLOSURE

Technical Problem

It is a problem to be solved by the present invention to provide an extrusion die capable of minimizing a stress magnitude and a stress gradient applied to an extrudate, and a method for extruding a sheet using the same.

In addition, it is another problem to be solved by the present invention to provide an extrusion die capable of improving the problem of sheet tilting and waving, and a method for extruding a sheet using the same.

Technical Solution

To solve the above-described problems, according to one aspect of the present invention, there is provided an extrusion die comprising a storage part configured to hold a raw material, the storage part defining a first width in a lateral direction perpendicular to a flow direction of the raw material, a pressure part configured to move the raw material through the storage part in the flow direction at a predetermined pressure, a first die defining a second width in the lateral direction that is less than the first width, such that a flow width of the raw material passing through the storage part becomes narrower as the raw material passes into the first die, a second die in fluid communication with the first die, the second die defining a width in the lateral direction that increases from the second width to a third width that is greater than the second width, such that the flow width of the raw material passing through the first die becomes wider and a flow thickness in a depth direction perpendicular to the lateral direction and the flow direction becomes smaller as the raw material passes through the second die, and a heating part configured to heat the raw material passing through the second die.

It is also preferable that the heating part is located closer to an outlet side of the second die than an inlet side.

Furthermore, the heating part may be configured to apply heat across the entire flow width of the raw material.

In addition, the heating part may be configured to apply heat across a distance of 10 mm or more along the flow direction of the raw material.

Also, the heating part may be configured to raise a temperature of the raw material by 5 to 20° C. relative to a room temperature.

Furthermore, a start portion and an end portion of the heating zone each may define a curved line shape.

In addition, an inlet of the second die has the second width in the lateral direction and an outlet of the second die has the third width in the lateral direction. Also, the flow width of the raw material in the lateral directly may linearly increase along the flow direction of the raw material within the second die. For example, the second die may have a fan shape with a wider width toward the outlet side.

Besides, the raw material may be a polymer paste comprising a powder resin and a lubricant. Also, the raw material may be in a room temperature state.

Furthermore, the storage part and the first die may be configured to be operated at a room temperature.

In addition, according to another aspect of the present invention, there is provided a method for extruding a sheet using the extrusion die, comprising steps of: providing the raw material in the storage part, the raw material being a polymer paste containing a powder resin and a lubricant; pressurizing the raw material in the storage part, such that the raw material passes through the first die and then through the second die, and operating the heating part to raise the temperature of the raw material as it passes through the second die, wherein the heating part raises a temperature of the raw material by 5 to 20° C. relative to a room temperature.

Advantageous Effects

As described above, the extrusion die related to at least one embodiment of the present invention and the method for extruding a sheet using the same have the following effects.

By providing the heating part on the second die outlet side, the temperature of the extrudate can be raised (within the range of about 5 to 20° C. relative to room temperature) to minimize the stress magnitude and stress gradient applied to the extrudate. As a result, the problems of sheet tilting and waving can be improved.

BRIEF DESCRIPTION OF DRAWINGS

FIG. 1 is a conceptual diagram showing a general sheet extrusion die.

FIG. 2 is a conceptual diagram reproducing flow of a raw material passing through the sheet extrusion die of FIG. 1.

FIG. 3 is a conceptual diagram showing an extrusion die related to one embodiment of the present invention.

FIG. 4 is a conceptual diagram reproducing flow of the raw material passing through the extrusion die of FIG. 3;

FIGS. 5 and 6 show analysis results of temperature and stress distribution in the heating zone, respectively.

MODE FOR INVENTION

Hereinafter, an extrusion die according to one embodiment of the present invention and a method for extruding a sheet using the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 3 is a conceptual diagram showing an extrusion die (100) according to one embodiment of the present invention, and FIG. 4 is a conceptual diagram reproducing flow of a raw material (P) passing through the extrusion die of FIG. 3. On the other hand, in FIG. 3, F represents the moving direction of the raw material, and in FIG. 4, P1 represents the raw material in the storage part (120), P2 represents the raw material in the first die (130) and P3 represents the raw material in a second die (140) (or referred to as 'sheet').

The extrusion die (100) related to one embodiment of the present invention comprises a storage part (120), a pressure part (150), a first die (130), a second die (140), and a heating part (160).

Specifically, the extrusion die (100) comprises a storage part (120) for holding a raw material (P) and a pressure part (150) for moving the raw material (P) in the storage part (120) at a predetermined pressure. At this time, the pressure part (150) may comprise a piston and a driving portion (e.g., a cylinder, etc.) for moving the piston. The pressure part (150) may be provided so as to be capable of adjusting the moving speed of the piston and the pressure applied to the raw material. For example, the pressure part (150) may be provided so as to apply a constant pressure to the raw material. Also, the pressure part (150) may be provided so as to move the raw material at a constant velocity.

Also, the extrusion die (100) comprises a first die (130) provided so that the flow width of the raw material passing through the storage part (120) becomes narrower, and a second die (140) provided so that the flow width (x-axis direction) of the raw material passing through the first die becomes wider and the flow thickness becomes smaller, along the flow direction of the raw material.

The first die (130) is the above-described capillary die and the first die (130) has a first flow passage (131) with a first width such that the raw material passes, where the first flow passage (131) has a first width that is less than the width of the storage part (120). The width or width direction herein refers to the length in the x-axis direction or the x-axis direction, on the basis of FIG. 3.

Furthermore, the second die (140) has a second flow passage fluidly connected to the first flow passage (131), where the second die (140) may be provided such that an inlet (141) has a second width and an outlet (142) has a third width greater than the second width. The second width may be equal to or greater than the first width. Also, the second die (140) may be provided so as to linearly increase the flow width along the flow direction of the raw material (P3). For example, the second die (140) may have a fan shape with a wider width toward the outlet (142) side.

In addition, the extrusion die (100) comprises a heating part (160) for heating the raw material (P3) passing through the second die (140). The heating part (160) may comprise one or more heaters.

It is also preferable that the heating part (160) is arranged closer to the outlet (142) side of the second die (140) than the inlet (141) side.

Furthermore, the heating part (140) may be provided to apply heat over the entire flow width of the raw material (P3). In addition, the heating part (140) may be provided so as to apply heat over an area of 10 mm or more along the flow direction (F) of the raw material. Referring to FIGS. 3 and 4, a heating zone (H) where heat is applied to the raw material by the heating part (160) is formed over the entire flow width, which is formed over an area of 10 mm or more along the flow direction (F) of the raw material.

In addition, the heating part (160) may be provided so as to raise the raw material (P3) passing through the second die (140) by 5 to 20° C. relative to room temperature.

Also, the heating part (160) may be provided such that the start portion and the end portion of the heating zone (H) along the flow direction of the raw material are each formed in a curved line shape along the flow direction of the raw material. That is, both the start portion and the end portion can have a fan arc shape, where the length of the arc is greater at the end portion than at the start portion.

The heating part (160) may be provided so as to increase the width of the heating zone (H) along the moving direction of the raw material. This is to correspond to the flow width of the raw material depending on the moving direction of the raw material.

On the other hand, the raw material (P) may be a polymer paste comprising a powder resin and a lubricant. Also, the raw material (P) may be in a room temperature state.

Also, the storage part (120) and the first die (130) may be maintained at room temperature. That is, in the process that the raw material at a room temperature state passes through the heating part (160) of the second die (140), it may be increased by 5 to 20° C. relative to room temperature.

Hereinafter, a method for extruding a sheet using the extrusion die (100) with the structure as above will be described in detail.

A method for producing a sheet related to one embodiment of the present invention comprises steps of providing a polymer paste raw material (P1) containing a powder resin and a lubricant in the storage part (120), pressurizing the raw material (P1) in the storage part (120) to sequentially pass the first die (130) and the second die (140) and operating the heating part (160) to raise the temperature of the raw material passing through the second die (140).

Here, the heating part (160) is provided so as to raise the raw material by 5 to 20° C. relative to room temperature.

Also, the heating part (140) may be provided so as to apply heat over the entire flow width of the raw material (P3). Furthermore, the heating part (140) may be provided so as to apply heat over an area of 10 mm or more along the flow direction (F) of the raw material. Referring to FIGS. 3 and 4, a heating zone (H) where heat is applied to the raw material by the heating part (160) is formed over the entire flow width, which is formed over an area of 10 mm or more along the flow direction (F) of the raw material.

FIGS. 5 and 6 show the analysis results of the temperature and stress distribution in the heating zone (H), respectively.

FIGS. 5(a) and 6(a) show the analysis results of the case where the heating part is not provided, FIGS. 5(b) and 6(b) show the analysis results of the case where the raw material is raised by 5° C. relative to room temperature through the heating part, FIGS. 5(c) and 6(c) show the analysis results of the case where the raw material is raised by 10° C. relative to room temperature through the heating part, and FIGS. 5(d) and 6(d) show the analysis results of the case where the raw material is raised by 20° C. relative to room temperature. Furthermore, H denotes a heating zone where heat is applied to the raw material, as described above.

Referring to FIGS. 5 and 6, it can be confirmed that when the temperature of the raw material passing through the second die (140) is raised, the stress magnitude and the stress gradient across the extrudate decrease. Particularly, it can be confirmed that when the temperature is raised by 10° C. through the heating part, the stress magnitude is reduced to half of the conventional level, and the stress gradient is remarkably improved.

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

By raising the temperature of the extrudate through the sheet extrusion die related to the present invention, the stress magnitude and stress gradient applied to the extrudate can be minimized

The invention claimed is:

1. An extrusion die comprising:
 a storage part configured to hold a raw material, the storage part defining a first width in a lateral direction perpendicular to a flow direction of the raw material;
 a pressure part configured to move the raw material through the storage part in the flow direction at a predetermined pressure;
 a first die defining a second width in the lateral direction that is less than the first width, such that a flow width of the raw material passing through the storage part becomes narrower as the raw material passes into the first die;
 a second die in fluid communication with the first die, the second die defining a width in the lateral direction that increases from the second width to a third width that is greater than the second width, such that the flow width of the raw material passing through the first die becomes wider and a flow thickness in a depth direction perpendicular to the lateral direction and the flow direction becomes smaller as the raw material passes through the second die; and
 a heating part configured to heat the raw material passing through the second die, an entirety of the heating part being located closer to an outlet side of the second die than an inlet side,
 wherein a start portion and an end portion of a heating zone of the heating part each define a curved line shape transverse to the flow direction of the raw material, both the start portion and the end portion have a fan arc shape, and the fan arc shape of the end portion defines a first arc length that is greater than a second arc length of the fan arc shape of the start portion.

2. The extrusion die according to claim 1, wherein the heating part is configured to apply heat across the entire flow width of the raw material.

3. The extrusion die according to claim 2, wherein the heating part is configured to apply heat across a distance of 10 mm or more along the flow direction of the raw material.

4. The extrusion die according to claim 3, wherein the heating part is configured to raise a temperature of the raw material by 5 to 20° C. relative to a room temperature.

5. The extrusion die according to claim 1, wherein an inlet of the second die has the second width in the lateral direction and an outlet of the second die has the third width in the lateral direction, such that the flow width of the raw material in the lateral direction is linearly increased along the flow direction of the raw material within the second die.

6. The extrusion die according to claim 1, wherein the raw material is a polymer paste containing a powder resin and a lubricant.

7. The extrusion die according to claim 6, wherein the storage part and the first die are configured to be operated at a room temperature.

8. The extrusion die according to claim 1, wherein the heating part is configured to apply heat across a distance of 10 mm or more along the flow direction of the raw material.

* * * * *